(12) United States Patent
Munoz

(10) Patent No.: US 6,343,124 B1
(45) Date of Patent: Jan. 29, 2002

(54) TELEPHONE NETWORKING SYSTEM

(75) Inventor: Robert J. Munoz, Gahanna, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/102,175

(22) Filed: Jun. 22, 1998

(51) Int. Cl.[7] .............................................. H04M 7/00
(52) U.S. Cl. .............. 379/230; 379/221.08; 379/221.09
(58) Field of Search ................................ 379/220, 221, 379/279, 900, 901

(56) References Cited

U.S. PATENT DOCUMENTS

| | | | |
|---|---|---|---|
| 4,924,510 A | | 5/1990 | Le |
| 5,386,467 A | | 1/1995 | Ahmad |
| 5,515,427 A | | 5/1996 | Carlsen et al. |
| 5,530,807 A | | 6/1996 | Baker et al. |
| 5,572,583 A | | 11/1996 | Wheeler, Jr. et al. |
| 5,583,920 A | * | 12/1996 | Wheeler, Jr. .................. 379/88 |
| 5,915,008 A | * | 6/1999 | Dulman ....................... 379/201 |
| 5,995,610 A | * | 11/1999 | Smidt et al. ................. 379/207 |
| 6,003,031 A | * | 12/1999 | Hartikainen et al. .......... 707/10 |
| 6,014,437 A | * | 1/2000 | Acker et al. ................. 379/219 |
| 6,084,956 A | * | 7/2000 | Turner et al. ................ 379/230 |
| 6,104,797 A | * | 8/2000 | Nabkel et al. ............... 379/201 |
| 6,104,803 A | * | 8/2000 | Weser et al. ................. 379/230 |
| 6,128,379 A | * | 10/2000 | Smyk .......................... 379/230 |

* cited by examiner

Primary Examiner—Ahmad F. Matar
Assistant Examiner—Hector Agdeppa
(74) Attorney, Agent, or Firm—Stevens & Showalter, LLP

(57) ABSTRACT

A telephone networking system includes a database having executable programs which are equivalent to customer record programs used by a SCP. A switching device retrieves one of the executable programs from the database in response to data received by an input device, such as a telephone. The executable program is transmitted across the network to be executed by an edge device having the capability to store information and perform logical operations. For an 800/888 telephone call, the executable program instructs the edge device to request and gather additional information. The additional information is then used by the executable program to generate the POTS number which is transmitted to the switching device to complete the call.

41 Claims, 1 Drawing Sheet

TELEPHONE NETWORKING SYSTEM

BACKGROUND OF THE INVENTION

The present invention relates in general to telecommunication networks, and, more particularly, to an intelligent network architecture for voice networks.

A major advance in telecommunication networks of the past decade has been the introduction of the intelligent network (IN) and the advanced intelligent network (AIN). Previous telecommunications networks consisted of switching systems interconnected by transmission facilities. The AIN enhances the capabilities of such systems by providing service control points (SCPs), intelligent peripherals (IPs) and service nodes (SNs). The SCPs, IPs, and SNs are configured to communicate or exchange information over the AIN via switching service points (SSPs). An SSP performs switching functions to route a call. An SCP includes a database that contains customer records defining how each customer's calls are to be handled. The IPs and SNs provide customized features and specialized call handling, including querying customers for additional information for controlling calls. For example, an IP may be configured to play an audio announcement and collect digits entered in response to the audio announcement. The IPs and the SNs therefore operate to increase the functionality of the AIN.

The IPs and the SNs are each connected to an associated switching system over both audio and data facilities while the SCPs are connected to the switching system over a data signaling network. The data signaling network is typically a common channel signaling network using the signaling system 7 (SS7) protocol promulgated by the Consultative Committee for International Telegraph and Telephone (CCITT) or by the American National Standards Institute (ANSI).

The intelligent and advanced intelligent networks are used, for example, to route 800/888 calls. Such calls lack a dial address that directly allows the telecommunications network to determine a terminating designation. Instead, upon receipt of an 800/888 number, an SSP queries an SCP to obtain information as to where to route the call. For a simple 800/888 call, the SCP returns a conventional plain old telephone service (POTS) number. A POTS number is a number that directly identifies the designation and is used by the SSP to route the call in a conventional way.

For some 800/888 calls, the 800/888 number itself is not sufficient to establish a call as the service may be set-up to route the call to a number of different designations depending on the customer's purpose. For example, the same 800/888 number may be used to contact a company's customer service department, ordering department, or shipping department, all of which may or may not be in the same building or geographic location. In these and other situations, the SCP needs additional information before a POTS number can be generated. The SCP sets up a transaction for the call and requests additional information through a series of messages exchanged between the SCP and the SSP. The messages from the SCP instruct the SSP to request and collect additional information from the customer. The collected information is then sent to the SCP to build state information concerning the call. Each transaction typically requires a number of operations with each operation resulting in the exchange of messages between the SSP and the SCP. The SCP executes a single operation at a time such that the SCP may request additional information a number of times before the POTS number can be determined and the transaction completed.

There are a number of disadvantages with such a system. If the SCP fails while a transaction is in progress, the entire call is lost because the state information of the call is built and stored in the SCP. Further, the duration of each transaction is relatively long as the SCP only performs one operation at a time for each transaction. Additionally, the SCP must wait while the SSP gathers the additional information such that latency in the SCP is improved.

Accordingly, there is a need for telephone networking systems where much of the functionality of the SCP is transferred closer to the edge of the network so as to increase the reliability and the speed of the network. Preferably, such a system would be relatively easy to manage and maintain and would be less complex than prior art networking systems.

SUMMARY OF THE INVENTION

The present invention meets this need by providing a telephone networking system in which the equivalent of the SCP customer record is retrieved from a database and transmitted across the network to be executed by an edge device having the capability to store information and perform logical operations. The equivalent SCP customer record is written in the form of an executable program which is executed by the edge device. For the 800/888 example, the executable program instructs the edge device to request and gather additional information. The additional information is then used by the executable program to generate the POTS number which is transmitted to the SSP to complete the call.

According to a first aspect of the present invention, a telephone networking system comprises a switching system, an input device, and a service logic database comprising a plurality of executable programs. The input device is configured to transmit input data corresponding to at least the digits of a dialed number to the switching system. The switching system is programmed to access the service logic database to retrieve one of the plurality of executable programs in response to the input data. The executable program is then transmitted to a network edge device for execution to complete routing of a call.

Preferably, each of the plurality of executable programs comprises an applet. The executable programs from the service logic database may be configured to request at least one set of additional input data from the input device. The executable programs may also be configured to generate routing data in response to the set of additional input data. The executable programs are preferably configured to cause the routing data to be transmitted to the switching system for routing of the call. The executable programs may be configured to request a plurality of sets of additional input data from the input device. The executable programs are then configured to generate routing data in response to the plurality of sets of additional input data. The executable programs may also be configured to cause the network edge device to interface with the switching system only after receiving the plurality of sets of additional input data.

The networking system may further comprise a service control point with the executable programs being configured to request data from the service control point in response to the set of additional input data. The executable programs may be configured to generate routing data in response to the data from the service control point and the set of additional input data. Preferably, the service control point is configured to generate routing data in response to the data from the service control point and the set of additional input data.

The networking system may further comprise a plurality of substantially identical service logic databases. Preferably, the input device is microprocessor controlled customer premises equipment, such as a microprocessor controlled telephone. The network edge device is preferably configured to determine whether the input device is microprocessor controlled customer premises equipment or non-microprocessor controlled customer premises equipment. The network edge device is selected from the group consisting of the switching system, the input device, an intelligent peripheral and a service node. The switching system preferably comprises a service switching point.

According to another aspect of the present invention, a telephone networking system comprises a switching system, an input device transmitting input data corresponding to at least the digits of a dialed number to the switching system, a service logic database comprising a first plurality of executable programs, a service control point comprising a second plurality of executable programs substantially functionally equivalent to the first plurality of executable programs, and at least one of an intelligent peripheral and a service node with at least one of the switching system, the intelligent peripheral and the service node being configured to determine whether the input device is microprocessor controlled customer premises equipment or non-microprocessor controlled customer premises equipment. The switching system is programmed to access the service logic database to retrieve one of the first plurality of executable programs in response to the input data if the input device is microprocessor controlled customer premises equipment with the executable program of the first plurality of executable programs being transmitted to one of the switching system, the intelligent peripheral, the service node, and the input device for execution to complete routing of a call.

The microprocessor controlled input device preferably comprises a display device such that the executable program is configured to cause the input device to display a request for at least one set of additional input data on the display device. The switching system may be programmed to access the service logic database to retrieve one of the first plurality of executable programs if said input device is non-microprocessor controlled customer premises equipment with the selected executable program being transmitted to one of the switching system, the intelligent peripheral and the service node for execution to complete routing of a call. The selected executable program is preferably configured to cause one of the switching system, the intelligent peripheral and the service node to play an audio request for at least one set of additional input data from the input device. The switching system may also be programmed to access the service control point to request execution of one of the second plurality of executable programs by the service control point in response to the input data if the input device is non-microprocessor controlled customer premises equipment to complete routing of the call.

Preferably, each of the first plurality of executable programs comprises an applet. The executable programs from the first plurality of executable programs may be configured to request at least one set of additional input data from the input device. The executable programs from the first plurality of executable programs are preferably configured to generate routing data in response to the set of additional input data. The executable programs from the first plurality of executable programs may be configured to cause the routing data to be transmitted to the switching system for routing of the call. The executable programs from the first plurality of executable programs may also be configured to request data from the service control point in response to the set of additional input data. The executable programs from the first plurality of executable programs may be configured to generate routing data in response to the data from the service control point and the set of additional input data. The switching system preferably comprises a service switching point.

According to yet another aspect of the present invention, a method of establishing a telephone call in a telephone networking system in response to input data from an input device comprises accessing one of a plurality of executable programs from a service logic database based on the input data. The executable program is transmitted from the service logic database to a network edge device for execution. The executable program is executed by the network edge device to generate routing data in response to a set of additional data. The routing data is transmitted to a switching system to route the telephone call.

Preferably, each of the plurality of executable programs comprises an applet. The step of executing the executable program to generate routing data in response to the set of additional data may comprise the step of requesting the set of additional data. The step of executing the executable program may comprise the step of requesting a plurality of sets of additional data. The step of executing the executable program is preferably completed by the network edge device prior to the step of transmitting the routing data to a switching system to route the telephone call. The step of executing the one executable program may comprise the step of requesting data from a service control point in response to the set of additional input data. The step of executing the executable program may comprise the step of generating the routing data in response to the data from the service control point and the set of additional input data.

According to a further aspect of the present invention, a method of establishing a telephone call in a telephone networking system in response to input data from an input device comprises determining if the input device is microprocessor controlled customer premises equipment or non-microprocessor controlled customer premises equipment. If the input device is microprocessor controlled customer premises equipment, one of a first plurality of executable programs is accessed from a service logic database based on the input data. The executable program from the first plurality of executable programs is transmitted from the service logic database to a network edge device for execution. The executable program from the first plurality of executable programs is executed by the network edge device. At least one set of additional data is requested. Routing data is generated in response to the set of additional data. The routing data is transmitted to a switching system to route the telephone call.

The executable program from the first plurality of executable programs is preferably configured to cause the input device, if microprocessor controlled, to display a request for the set of additional of input data on a display device. If the input device is non-microprocessor controlled customer premises equipment one of the first plurality of executable programs is accessed from a service logic database based on the input data. The selected executable program from the service logic database is transmitted to a network edge device not including the input device for execution. The selected executable program is executed in the network edge device. At least one set of additional data is requested. Routing data is generated in response to the set of additional data. The routing data is transmitted to the switching system to route the telephone call. The selected executable program is preferably configured to cause the input device or network edge device to play an audio request for the set of additional data. If the input device is non-microprocessor controlled customer premises equipment, one of a second plurality of executable programs is accessed from a service control point based on the input data. The executable program from the second plurality of executable programs is executed by the service control point to determine routing data. The routing data is transmitted to the switching system to route the telephone call.

Accordingly, it is an object of the present invention to provide a telephone networking system where much of the functionality of the SCP is transferred closer to the edge of the network. It is another object of the present invention to provide a networking system that is faster and more reliable than prior art networking systems. It is a further object of the present invention to provide a networking system that is relatively easy to manage, relatively easy to maintain and is less complex than prior art networking systems. Other features and advantages of the invention will be apparent from the following description, the accompanying drawings and the appended claims.

DETAILED DESCRIPTION OF THE PREFERRED EMBODIMENTS

Figure 1:
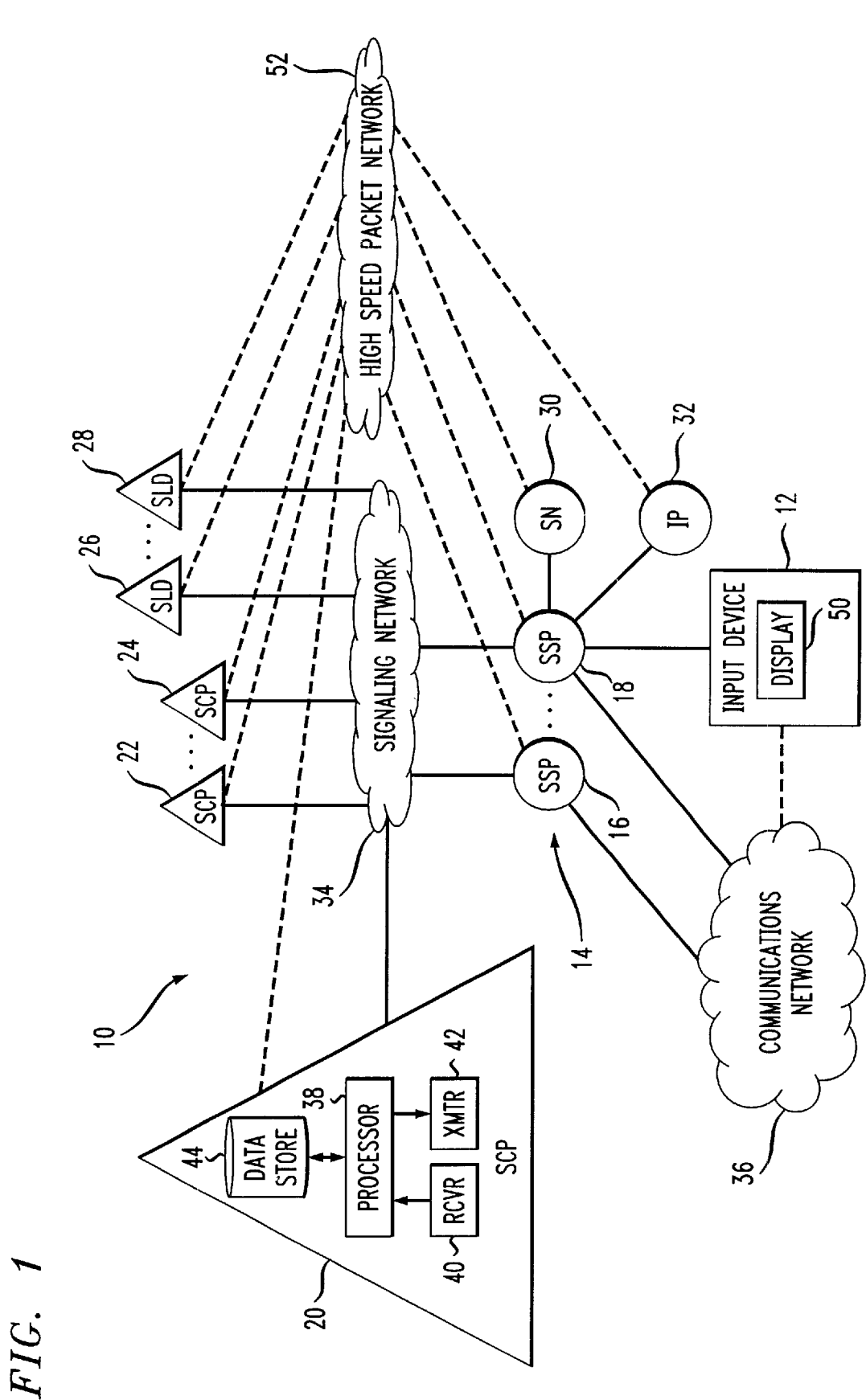
FIG. 1 is a block diagram of a telephone networking system according to the present invention.

Referring now to FIG. 1, a block diagram of a telephone networking system 10, illustrated as an advanced intelligent network (AIN), according to the present invention is shown. While the AIN is discussed generally to describe the present invention, a more thorough description of Intelligent Networks (Ins) and AINs may be found in Seamless Networks, Interoperating Wireless and Wireline Networks, by Arkady Grinberg, herein incorporated by reference. The networking system 10 comprises an input device 12, a switching system 14 in the form of a plurality of SSPs 16, 18 in the illustrated embodiment, a plurality of SCPs 20, 22, 24, a plurality of service logic databases (SLDs) 26, 28, an intelligent peripheral (IP) 30, a service node (SN) 32, a signaling network 34 and a communications network 36. The SSPs 16, 18 are typically referred to as ingress switches. The SCPs 20, 22, 24 and the SSPs 16, 18 are interconnected by signaling network 34 which transmits signaling system seven (SS7) messages between SCPs and SSPs or other switching systems coupled to the signaling network 34. The SSPs 16, 18 are interconnected with each other and other switching systems of the AIN by communications network 36. The SLDs 26, 28 are coupled to the SSPs 16, 18 via the signaling network 34. The SN 30 and the IP 32 are coupled to SSP 18 by both voice and signaling links. It will be appreciated by those skilled in the art that a plurality of SNs and a plurality of IPs may be coupled to each of the SSPs in the telephone networking system 10 as necessary to achieve desired networking functions.

Each of the SSPs 16 and 18 are configured to communicate with the SCPs 20, 22, 24 and the SLDs 26, 28 via the signaling network 34. The SSPs 16, 18 are processor controlled switches configured to route telephone calls in response to a call placed from an input device, such as the input device 12. In the illustrated embodiment, the SSPs 16, 18 each include a storage device (not shown) which, in conjunction with a processor (not shown), are capable of storing information and performing logical operations. The SSPs 16, 18 and the SCPs 20, 22, 24 are configured in the illustrated embodiment to communicate with each other via the exchange of Transaction Capabilities Application Part (TCAP) messages. Each of the SLDs 26, 28 includes a storage device (not shown) for storing a first plurality of executable programs. The SLDs 26, 28 are basically "dumb" databases in that they only store stored program data and are not capable of executing instructions in the stored program data. It should be apparent that the stored data is the first plurality of the executable programs in the illustrated embodiment. Each of the SLDs 26, 28 are substantially identical in that they each include a redundant set of the first plurality of programs for reliability in case one of the SLDs fails. However, it will be appreciated by those skilled in the art that the SLDs may also include programs and other data unique to each SLD. In the illustrated embodiment, the SLDs 26, 28 are configured to communicate with the SSPs 16, 18 more simply without the exchange of TCAP messages.

The SCPs 20, 22, 24 are processor controlled databases with SCP 20 being representative of the configuration of a typical SCP. Such processor controlled databases may be referred to as "smart" databases capable of executing instructions. SCP 20 includes a processor 38 coupled to a data receiver 40 for receiving signaling messages from the signaling network 34 and a data transmitter 42 for transmitting data to the signaling network 34. SCP 20 also includes a data storage device 44 for storing data. The stored data includes data tables and a second plurality of executable programs. Each of the SCPs 20, 22, 24 in the telephone networking system 10 are substantially identical in that they each include a redundant set of the second plurality of programs and the data tables for reliability in case one of the SCPs fails. However, it will be appreciated by those skilled in the art that the SCPs may also include programs and data tables unique to each SCP.

The input device 12 is coupled to the SSP 18, either directly or, in the more usual case, through the communications network 36. The input device 12 may comprise microprocessor controlled customer premises equipment, such as a computer or microprocessor controlled telephone, or non-microprocessor controlled customer premises equipment, such as a standard touch-tone or dial pulse telephone. It is to be understood that microprocessor controlled customer premises equipment is capable of storing information, performing logical operations and displaying information on a display device 50. The input device 12 is configured to transmit sets of input data to the telephone networking system 10 through the SSP 18. Initially, the input data typically corresponds to the digits of a dialed number. Additional sets of input data may also be transmitted to the networking system 10 as requested or required. It should be apparent that microprocessor controlled input devices have the capability of transmitting numeric and alphanumeric input data.

The SN 30 and IP 32 cooperate with the SSP 18 to provide customized features and specialized call handling. In the illustrated embodiment, the SN 30 and the IP 32 each include a storage device (not shown) and a processor (not shown) for storing information and performing logical operations. The SN 30, the IP 32 and the SSPs 16, 18 are also configured to determine whether the input device 12 is microprocessor controlled customer premises equipment or non-microprocessor controlled customer premises equipment. The SN30, the IP 32, the SSPs 16, 18, and the input device 12 are network edge devices since, as used herein, a network edge device is any device separated from the core of the network. Typically, the SCP is considered to be part of the core of the network. It should be apparent that the SN 30, the IP 32 and the SSPs 16, 18 have increased functionality and differ from the prior art in that they are capable of storing information and performing logical operations to execute programs as described below.

The second plurality of executable programs and the data tables in the SCPs are customer specific and function to generate routing data specific to each customer so a call can be completed based on the number of the originating call or the actual number being called. The second plurality of executable programs are written to perform desired functions specific to each customer. The programs and the data tables may be changed relatively easily as circumstances and needs change. It will be appreciated by those skilled in the art that it is easier to change a program or data table than the configuration of a switch to implement changes in the routing of calls. The SSP requests execution of one of the second plurality of executable programs in response to input data representative of a call. A customer specific transaction is therefore set-up for each program executed. Each of the second plurality of executable programs are executed by the corresponding SCP processor 38 a single operation at a time. The SCPs typically handle a number of different transactions simultaneously.

For example and as in the prior art, if the particular program requires a number of sets of additional data to complete a call and terminate the transaction, the processor 38 will send a TCAP message to the associated SSP via the transmitter 42 requesting the first set of additional data. The SCP will then wait for the set of additional data from the SSP. The time period between the request and receipt of the additional data is known as latency. Once generated, the first set of additional data is transmitted to the corresponding SCP via the receiver 40 in the form of another TCAP message. The TCAP messages include identifying information to match the additional data with the proper transaction. The processor 38 continues executing the program from the point of the first request and requests another set of additional data from the SSP in response to the first set of additional data. The SCP waits again for the additional data. This process of executing an operation and waiting is repeated until all of the additional data is received. The routing data, typically in the form of a POTS number, is then generated, transmitted to the SSP and the transaction is completed.

In the illustrated embodiment, the first plurality of executable programs stored in the SLDs are substantially functionally equivalent to the second plurality of executable programs in the SCPs. As used herein, "substantially functionally equivalent" means corresponding ones of the first and second plurality of executable programs function to route a call to the same terminating designation. The first plurality of executable programs are configured to be executed autonomously by a network edge device while the second plurality of executable programs are configured to be executed by the SCPs one operation at a time. The first plurality of executable programs basically include a set of instructions which are interpreted by another program within the network edge device for execution of the executable program. In other words, each of the first plurality of executable programs includes code which is executed by the network edge device, which includes appropriate programming for executing the code. In the illustrated embodiment, the first plurality of executable programs comprise applets, such as JAVA which is a trademark of Sun Microsystems, Inc. or Inferno which is a trademark of Lucent Technologies, Inc., with the network edge devices having a corresponding program to execute the applets.

As the entire program for each of the first plurality of executable programs is transmitted to and executed by a network edge device, remote evaluation of a call is performed as opposed to remote operation invocation as performed by the SCPs. The selected program from the SLD is executed locally without having to further interact with the SLD. Depending on the application, the selected program may be configured to request information from the customer via the input device 12. If so, the information, typically in the form of one or more sets of additional input data, is generated by the customer at the input 12 for use by the selected program. Once all of the required input data is received, the selected program determines routing data, again typically in the form of a POTS number. The routing data is then transmitted to the appropriate SSP to route the call. As the selected program is executed by sequencing from one operation to the next in the executable program, a call transaction record does not have to be maintained. The selected network edge device executes the entire program at one time locally, and typically, does not interface with the SSP until all of the required input data is received.

Conversely, a typical call utilizing one of the second plurality of executable programs may require several TCAP messages to be exchanged between the SSP and the SCP increasing call set-up time. The SCP needs to establish a transaction and call state data to keep track of all of the calls it is processing. The SCP interfaces with the SSP through the exchange of TCAP messages. As the SCP is processing a number of calls at any one time, a failure in a SCP could potentially cause the loss of all calls in process. However, a failure in a SLD is not as problematic as the SSP may access another SLD for the required program from the first plurality of executable programs. Accordingly, the reliability of the networking system 10 is improved.

The networking system 10 may be configured so that the first plurality of programs access data tables in a SCP. Depending on the application, the SCP may serve as a data repository with the first plurality of programs accessing the data tables in the SCP as needed to complete a call. Such a hybrid system retains the benefits of local execution of programs with large amounts of data remaining separate from the selected program to improve call set-up time and reduce the actual size of the program.

In systems where the input device may be the device for executing one of the first plurality of programs or where the intelligence of the input device may be used in executing one of the first plurality of programs, e.g., displaying information requests on a display, before either the SCPs or SLDs are accessed, the SSP, IP or SN determine if the input device 12 includes microprocessor controlled customer equipment. If the SSP, IP or SN determines that the input device 12 is microprocessor controlled customer equipment, the SSP requests one of the first plurality of executable programs from a SLD in response to the input data from the input device 12. The selected program from the first plurality of executable programs is transmitted to the appropriate network edge device for execution. Typically, the selected program will be sent to the edge device most closely associated with the ingress switch accessed by the input device 12 to minimize the use of network resources. However, it will be appreciated by those skilled in the art that the selected program may be transmitted to any network edge device having the enhanced functionality required to execute the program, including the input device 12 itself.

One or more sets of additional data entered by the input device 12, along with appropriate time, date and other data, will be used by the selected program to generate routing data for the SSP. The selected program may be configured so that any request for additional information is displayed on the display device 50. Such a feature is particularly useful as a person typically reads a message much faster than the same message that can be spoken. The selected program may also be configured to execute differently depending on the number from which the call originated. For example, if the input device 12 includes microprocessor controlled customer equipment, but the customer making the call is blind, the selected program may be configured so that requests for additional information are played audibly.

If the SSP, IP or SN determines that the input device 12 does not include microprocessor controlled customer equipment, the SSP may still request one of the first plurality of executable programs from a SLD in response to the input data from the input device 12. The selected program is sent to any appropriate network edge device except for the non-microprocessor controlled input device 12 itself. The selected program may be the same program as used when the input device 12 includes microprocessor controlled customer equipment or it may be a different program. The selected program may be configured so that it can be used with microprocessor controlled customer equipment and non-microprocessor controlled customer equipment. The first plurality of executable programs may include a set of programs to be used only with microprocessor controlled customer equipment and another set of programs to be used with non-microprocessor controlled customer equipment. Typically, the selected program will be configured so that requests for additional information are audible. Accordingly, the first plurality of programs may be configured to account for the number being called, the number from which the call is made, the time of day, the geographical location of the customer making the call and any of a number of different variables.

Alternatively, if the SSP, IP or SN determines that the input device 12 is not microprocessor controlled customer equipment, the SSP may be configured to query a SCP to generate routing data using methods known in the art. The SSP also may be configured to access a SCP when the networking system 10 does not include any available SSPs, IPs or SNs to execute a program from the first plurality of executable programs.

The present invention will now be described using the 800/888 example described above. A customer makes an 800/888 call from microprocessor controlled customer equipment input device 12 to a corporation having a number of different departments and locations in a number of different geographical areas. The SSP 18 retrieves one of the first plurality of executable programs from one of the SLDs 26, 28 in response to the input data from the input device. The retrieved program is transmitted to one of the network edge devices for execution, the input device 12 in this example. The program is executed by the input device 12 which requests one or more sets of additional input data from the customer. For example, the program may be configured to request the department the customer wishes to reach. Based on the response, the program may request information on the area within the specific department which the customer wishes to reach. Depending on the particular application, the program may query a SCP for information or data in response to the one or more sets of additional data inputted by the customer. Once all of the information requested by the program via the input device 12 is received, the program generates the routing data. It should be apparent that the routing data generated may depend on the time of day that the call is placed so that the call is not routed to a location that has closed for the day. The program then causes the input device 12 to interface with the network system 10 so that the routing data may be transmitted to the SSP 18. The SSP then routes the call in a manner known in the art. Calls may be routed quickly, reliability and efficiently by utilizing network edge devices having enhanced functionality.

It will be appreciated by those skilled in the art that the first plurality of executable programs may be executed by other network edge devices. It will be further appreciated by those skilled in the art that only one of the network edge devices needs increased functionality to execute the first plurality of executable programs. It will be appreciated by those skilled in the art that the SCPs, SLDs, SSPs, SNs, IPs and input devices may be interconnected by a high speed packet network 52 as shown in FIG. 1. The high speed packet network 52 may function independently or in conjunction with the signaling network 34.

Having described the invention in detail and by reference to preferred embodiments thereof, it will be apparent that modifications and variations are possible without departing from the scope of the invention defined in the appended claims.

What is claimed is:

1. A telephone networking system comprising:

a switching system;

an input device transmitting input data to said switching system, said input data corresponding to at least the digits of a dialed number; and a service logic database coupled to said switching system and comprising a plurality of executable programs;

wherein said switching system is programmed to access said service logic database to retrieve one of said plurality of executable programs in response to said input data, said one executable program being transmitted to a network edge device for execution to complete routing of a call.

2. The system of claim 1, wherein each of said plurality of executable programs comprise an applet.

3. The system of claim 1, wherein said one executable program is configured to request at least one set of additional input data from said input device.

4. The system of claim 3, wherein said one executable program is configured to generate routing data in response to said at least one set of additional input data.

5. The system of claim 4, wherein said one executable program is configured to cause said routing data to be transmitted to said switching system for routing of said call.

6. The system of claim 1, wherein said one executable program is configured to request a plurality of sets of additional input data from said input device.

7. The system of claim 6, wherein said one executable program is configured to generate routing data in response to said plurality of sets of additional input data.

8. The system of claim 7, wherein said one executable program is configured to cause said network edge device to interface with said switching system only after receiving said plurality of sets of additional input data.

9. The system of claim 3, further comprising a service control point, and wherein said executable program is configured to request data from said service control point in response to said at least one set of additional input data.

10. The system of claim 9, wherein said executable program is configured to generate routing data in response to said data from said service control point and said at least one set of additional input data.

11. The system of claim 9, wherein said service control point is configured to generate routing data in response to said data from said service control point and said at least one set of additional input data.

12. The system of claim 1, further comprising a plurality of substantially identical service logic databases.

13. The system of claim 1, wherein said input device is microprocessor controlled customer premises equipment.

14. The system of claim 13, wherein said customer premises equipment is a telephone.

15. The system of claim 13, wherein said network edge device is configured to determine whether said input device is microprocessor controlled customer premises equipment or non-microprocessor controlled customer premises equipment.

16. The system of claim 1, wherein said network edge device is selected from the group consisting of said switching system, said input device, an intelligent peripheral and a service node.

17. The system of claim 1, wherein said switching system comprises a service switching point.

18. A telephone networking system comprising:
a switching system;
an input device transmitting input data to said switching system, said input data corresponding to at least the digits of a dialed number;
a service logic database coupled to said switching system and comprising a first plurality of executable programs;
a service control point coupled to said switching system and comprising a second plurality of executable programs substantially functionally equivalent to said first plurality of executable programs; and
at least one of an intelligent peripheral and a service node coupled to said switching system;
wherein at least one of said switching system, said intelligent peripheral and said service node is configured to determine whether said input device is microprocessor controlled customer premises equipment or non-microprocessor controlled customer premises equipment;
wherein said switching system is programmed to access said service logic database to retrieve one of said first plurality of executable programs in response to said input data if said input device is microprocessor controlled customer premises equipment, said one executable program of said first plurality of executable programs being transmitted to one of said switching system, said intelligent peripheral, said service node, and said input device for execution to complete routing of a call.

19. The system of claim 18, wherein said input device comprises a display device, and wherein said one executable program of said first plurality of executable programs is configured to cause said input device to display a request for at least one set of additional input data on said display device.

20. The system of claim 18, wherein said switching system is programmed to access said service logic database to retrieve one of said first plurality of executable programs if said input device is non-microprocessor controlled customer premises equipment, said one executable program of said first plurality of executable programs being transmitted to one of said switching system, said intelligent peripheral and said service node for execution to complete routing of a call.

21. The system of claim 20, wherein said one executable program of said first plurality of executable programs is configured to cause said one of said switching system, said intelligent peripheral and said service node to play an audio request for at least one set of additional input data from said input device.

22. The system of claim 18, wherein said switching system is programmed to access said service control point to request execution of one of said second plurality of executable programs by said service control point in response to said input data if said input device is non-microprocessor controlled customer premises equipment to complete routing of said call.

23. The system of claim 18, wherein each of said first plurality of executable programs comprises an applet.

24. The system of claim 18, wherein said one executable program of said first plurality of executable programs is configured to request at least one set of additional input data from said input device.

25. The system of claim 24, wherein said one executable program of said first plurality of executable programs is configured to generate routing data in response to said at least one set of additional input data.

26. The system of claim 25, wherein said one executable program of said first plurality of executable programs is configured to cause said routing data to be transmitted to said switching system for routing of said call.

27. The system of claim 24, wherein said one executable program of said first plurality of executable programs is configured to request data from said service control point in response to said at least one set of additional input data.

28. The system of claim 27, wherein said executable program of said first plurality of executable programs is configured to generate routing data in response to said data from said service control point and said at least one set of additional input data.

29. The system of claim 18, wherein said switching system comprises a service switching point.

30. A method of establishing a telephone call in a telephone networking system in response to input data from an input device, said method comprising the steps of:
accessing one of a plurality of executable programs from a service logic database based on said input data;
transmitting said one executable program from said service logic database to a network edge device for execution;
executing said one executable program to generate routing data in response to at least one set of additional data; and
transmitting said routing data to a switching system to route said telephone call.

31. The method of claim 30, wherein each of said plurality of executable programs comprises an applet.

32. The method of claim 31, wherein said step of executing said one executable program to generate routing data in response to said at least one set of additional data comprises the step of requesting said at least one set of additional data.

33. The method of claim 32, wherein said step of executing said one executable program comprises the step of requesting a plurality of sets of additional data.

34. The method of claim 33, wherein said step of executing said one executable program is completed by said network edge device prior to said step of transmitting said routing data to a switching system to route said telephone call.

35. The method of claim 30, wherein said step of executing said one executable program comprises the step of requesting data from a service control point in response to said at least one set of additional input data.

36. The method of claim 35, wherein said step of executing said one executable program comprises the step of generating said routing data in response to said data from said service control point and said at least one set of additional input data.

37. A method of establishing a telephone call in a telephone networking system in response to input data from an input device, said method comprising the steps of:

determining if said input device is microprocessor controlled customer premises equipment or non-microprocessor controlled customer premises equipment;

if said input device is microprocessor controlled customer premises equipment, accessing one of a first plurality of executable programs from a service logic database based on said input data;

transmitting said one executable program of said first plurality of executable programs from said service logic database to a network edge device for execution;

executing said one executable program of said first plurality of executable programs in said network edge device thereby requesting at least one set of additional data and generating routing data in response to said least one set of additional data; and transmitting said routing data to a switching system to route said telephone call.

38. The method of claim 37, wherein said step of executing said one executable program of said first plurality of executable programs in said network edge device thereby requesting at least one set of additional data and generating routing data in response to said least one set of additional data comprises the step of displaying a request for said at least one set of additional of input data on a display device of said input device.

39. The method of claim 37, wherein if said input device is non-microprocessor controlled customer premises equipment, the method comprises the steps of:

accessing one of said first plurality of executable programs from said service logic database based on said input data;

transmitting said one executable program of said first plurality of executable programs from said service logic database to said network edge device for execution, said network edge device not including said input device;

executing said one executable program of said first plurality of executable programs in said network edge device thereby requesting at least one set of additional data and generating routing data in response to said least one set of additional data; and transmitting said routing data to said switching system to route said telephone call.

40. The method of claim 39, wherein said step of executing said one executable program of said first plurality of executable programs in said network edge device thereby requesting at least one set of additional data and generating routing data in response to said least one set of additional data comprises the step of playing an audio request to collect said at least one set of additional data.

41. The method of claim 37, wherein if said input device is non-microprocessor controlled customer premises equipment, said method comprises the steps of:

accessing one of a second plurality of executable programs from a service control point based on said input data;

executing said one executable program of said second plurality of executable programs in said service control point to determine routing data; and transmitting said routing data to said switching system to route said telephone call.

\* \* \* \* \*

UNITED STATES PATENT AND TRADEMARK OFFICE
CERTIFICATE OF CORRECTION

PATENT NO. : 6,343,124 B1
DATED : January 29, 2002
INVENTOR(S) : Robert J. Munoz Page 1 of 1

It is certified that error appears in the above-identified patent and that said Letters Patent is hereby corrected as shown below:

Column 4,
Line 55, "additional of input data" should read -- additional input data --.

Column 9,
Line 5, "that can be spoken." should read -- can be spoken. --.

Column 13,
Line 31, "to said least" should read -- to said at least --.
Line 33, "additional of input" should read -- additional input --.

Column 14,
Line 13, "least" should read -- at least --.
Line 20, "said least" should read -- said at least --.

Signed and Sealed this

Twenty-third Day of April, 2002

Attest:

Attesting Officer

JAMES E. ROGAN
*Director of the United States Patent and Trademark Office*